(12) United States Patent
Mögele et al.

(10) Patent No.: US 9,321,934 B2
(45) Date of Patent: Apr. 26, 2016

(54) METHOD AND MATERIAL SYSTEM FOR BUILDING MODELS IN LAYERS

(75) Inventors: Florian Mögele, Gessertshausen (DE); Imke Nora Kellner, Braunschweig (DE)

(73) Assignee: VOXELJET AG, Friedberg (DE)

( * ) Notice: Subject to any disclaimer, the term of this patent is extended or adjusted under 35 U.S.C. 154(b) by 325 days.

(21) Appl. No.: 13/977,209

(22) PCT Filed: Dec. 7, 2011

(86) PCT No.: PCT/DE2011/002087
§ 371 (c)(1),
(2), (4) Date: Jul. 31, 2013

(87) PCT Pub. No.: WO2012/097772
PCT Pub. Date: Jul. 26, 2012

(65) Prior Publication Data
US 2013/0302575 A1    Nov. 14, 2013

(30) Foreign Application Priority Data

Dec. 29, 2010    (DE) .......................... 10 2010 056 346

(51) Int. Cl.
| | | |
|---|---|---|
| B29C 67/00 | (2006.01) | |
| C09D 133/12 | (2006.01) | |
| B05D 1/00 | (2006.01) | |
| B29K 33/00 | (2006.01) | |
| B29K 77/00 | (2006.01) | |

(52) U.S. Cl.
CPC ............... *C09D 133/12* (2013.01); *B05D 1/00* (2013.01); *B29C 67/0081* (2013.01); *B29K 2033/12* (2013.01); *B29K 2077/00* (2013.01); *Y10T 428/24802* (2015.01)

(58) Field of Classification Search
None
See application file for complete search history.

(56) References Cited

U.S. PATENT DOCUMENTS

| | | | |
|---|---|---|---|
| 6,259,962 B1 * | 7/2001 | Gothait | B29C 67/0059 700/118 |
| 8,741,194 B1 | 6/2014 | Ederer et al. | |
| 2004/0026418 A1 | 2/2004 | Ederer et al. | |
| 2004/0035542 A1 | 2/2004 | Ederer et al. | |
| 2004/0036200 A1 * | 2/2004 | Patel | B29C 67/0081 264/401 |
| 2004/0170765 A1 | 9/2004 | Ederer et al. | |
| 2005/0017394 A1 | 1/2005 | Hochsmann et al. | |
| 2005/0167872 A1 | 8/2005 | Tsubaki et al. | |
| 2005/0218549 A1 * | 10/2005 | Farr | B29C 67/0081 264/109 |
| 2006/0105102 A1 | 5/2006 | Hochsmann et al. | |
| 2006/0108090 A1 | 5/2006 | Ederer et al. | |
| 2006/0175346 A1 | 8/2006 | Ederer et al. | |
| 2006/0237159 A1 | 10/2006 | Hochsmann | |
| 2008/0001331 A1 | 1/2008 | Ederer | |
| 2008/0018018 A1 * | 1/2008 | Nielsen | B29C 67/0081 264/308 |
| 2008/0138515 A1 * | 6/2008 | Williams | B29C 67/0081 427/222 |
| 2008/0233302 A1 * | 9/2008 | Elsner | B29C 67/0059 427/421.1 |
| 2008/0237933 A1 | 10/2008 | Hochsmann et al. | |
| 2008/0260945 A1 | 10/2008 | Ederer et al. | |
| 2009/0261497 A1 | 10/2009 | Ederer et al. | |
| 2010/0212584 A1 | 8/2010 | Ederer et al. | |
| 2010/0243123 A1 | 9/2010 | Ederer et al. | |
| 2010/0244301 A1 | 9/2010 | Ederer et al. | |
| 2010/0272519 A1 | 10/2010 | Ederer et al. | |
| 2010/0291314 A1 * | 11/2010 | Kashani-Shirazi | B29C 67/0081 427/521 |
| 2011/0223437 A1 * | 9/2011 | Ederer | B29C 67/0081 428/500 |
| 2011/0308755 A1 | 12/2011 | Hochsmann | |
| 2012/0094026 A1 | 4/2012 | Ederer et al. | |
| 2012/0097258 A1 | 4/2012 | Hartmann | |
| 2012/0113439 A1 | 5/2012 | Ederer | |
| 2012/0291701 A1 | 11/2012 | Grasegger et al. | |
| 2013/0000549 A1 | 1/2013 | Hartmann et al. | |
| 2013/0004610 A1 | 1/2013 | Hartmann et al. | |
| 2013/0026680 A1 | 1/2013 | Ederer et al. | |
| 2013/0029001 A1 | 1/2013 | Gunther et al. | |
| 2013/0092082 A1 | 4/2013 | Ederer et al. | |
| 2013/0199444 A1 | 8/2013 | Hartmann | |
| 2013/0234355 A1 | 9/2013 | Hartmann et al. | |
| 2013/0313757 A1 | 11/2013 | Kashani-Shirazi | |
| 2014/0202381 A1 | 7/2014 | Ederer et al. | |
| 2014/0212677 A1 | 7/2014 | Gnuchtel et al. | |
| 2014/0227123 A1 | 8/2014 | Gunster | |
| 2014/0306379 A1 | 10/2014 | Hartmann et al. | |

(Continued)

FOREIGN PATENT DOCUMENTS

| | | |
|---|---|---|
| DE | 102006038858 A1 | 2/2008 |
| EP | 0431924 A2 | 6/1991 |

(Continued)

OTHER PUBLICATIONS

International Search Report, Application No. PCT/DE2011/002087 dated Jun. 13, 2012.

(Continued)

*Primary Examiner* — Mary F Theisen
(74) *Attorney, Agent, or Firm* — The Dobrusin Law Firm, P.C.

(57) ABSTRACT

The present invention describes a method for building models in layers, wherein a first material and subsequent thereto selectively a second material are applied in layers in a build space, and these two application steps are repeated until a desired model is obtained. The two materials form a solid object in a suitable mixing ratio, the first material including a particulate material and the second material being applied with the aid of a print head. The first material, the second material and/or the particulate material include one or more diamines and/or one or more dicarbonyl compounds as the binder.

20 Claims, No Drawings

(56) References Cited

U.S. PATENT DOCUMENTS

| | | |
|---|---|---|
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |

FOREIGN PATENT DOCUMENTS

| | | |
|---|---|---|
| FR | 1497414 A | 10/1967 |
| WO | 01/68375 A2 | 9/2001 |
| WO | 2005/113219 A1 | 12/2005 |

OTHER PUBLICATIONS

International Preliminary Report on Patentability, Application No. PCT/DE2011/002087 dated Jul. 2, 2013.

Translation of Written Opinion of the International Searching Authority, Application No. PCT/DE2011/002087 dated Jun. 13, 2012.

* cited by examiner

METHOD AND MATERIAL SYSTEM FOR BUILDING MODELS IN LAYERS

CLAIM OF PRIORITY

This application is a national phase filing under 35 USC §371 from PCT Application serial number PCT/DE2011/002087 filed on Dec. 7, 2011, and claims priority therefrom. This application further claims priority from German Patent Application Number DE 10 2010 056 346.3 filed Dec. 29, 2010. PCT/DE2011/002087 and DE 10 2010 056 346.3 are both incorporated herein by reference.

The invention relates to a method for building models in layers as well as to material systems for use in methods of this type.

Generative methods for producing 3D structures have long been known (for example, from EP 0 431 924 B1 or WO200168375A2).

This includes, among other things, stereo lithographic methods (solidification of monomeric liquids using a high energy beam), selective laser sintering (melting particulate material using a high energy beam) and 3D printing. All aforementioned methods permit the comparatively economical manufacture of molds for building prototypes. When printing devices are equipped with multiple controllable nozzles, 3D printing permits building speeds that are superior to all other methods. Its application is therefore not limited to prototypes. Even series-produced components may be produced economically.

In principle, different methods may be derived from the prior art: systems that are entirely liquid-based and systems that use powder materials, which are selectively solidified by the introduction of liquid.

The first of these systems, which are entirely liquid-based, are known, for example, from U.S. Pat. No. 6,259,962 of Object Geometries Ltd. This method is based on the fact that two different materials are generated during solidification. The model produced in layers may then be removed from the support material alter printing process with the aid of a dissolving method—for example, a water bath.

Solidification of the materials, which were initially fluid for printing, may take place, for example, using UV radiation. In addition, two-component or multicomponent systems may be used, which are brought together and solidified on the building platform. However, since the complete building volume must be generated with the aid of ink-jet printers, this method is comparatively slow and therefore suitable only for small components.

The methods for building models in layers which use particulate material are a much more economical alternative, in particular with regard to time intensity. In these methods, a powdered material is selectively bonded. The particulate material is applied in thin layers and smoothed on a workplace platform, for example using a coater. A print head solidifies selective areas on the powder layer on the basis of component data stored in the computer. This process continues to be repeated until the component is finished and may be removed from the unbound particulate material.

One advantage of this approach is that part of the component material is already provided by the volume of the particulate material. The amount that must be dispensed in liquid form is therefore comparatively small. As a result, this method permits high print head speeds, short layering times and a—comparatively—simple print head structure.

In this case, the particulate material is solidified by the bonding of individual particles to each other.

Polymerizing systems have proven to be particularly successful here, since material does not need to be removed from the molding once it has been applied. In this regard, there is no danger of shrinkage and therefore material distortion. Secondly, polymerizing adhesives are known for their strong bonding forces.

The following main groups, which are suitable for a process of this type, may be essentially derived from the prior art:
Epoxy resin systems
Polyurethane systems
Melamine resin systems
Unsaturated polyester
2K silicone
Radically polymerizing systems (RPS)
Novolak systems RPS systems are frequently used. Many monomers exist which meet the requirements of the processes and the droplet generators. With few exceptions, the other aforementioned systems do not meet the requirements of the droplet generators.

Starting the reaction is problematic with the RPS systems, A component must be liquid for processing in droplet generators. This component must begin to solidify only when it is dispensed onto the powder. For this purpose, a component must be present in the powder, which triggers the start of the reaction.

In principle, there are two ways to maintain this component in the powder. Either the powder is a mixture of different particles, or the component is contained in the particles. Dibenzoyl peroxide, may be used as the initiator component in RPS. As a pure substance in powdered form, it is a source of danger. It tends to explode under mechanical impact. Mixing it into the base powder is therefore critical.

So-called head polymerizates, in which peroxide is present in the individual particulates, present a second possibility. A powder of this type is not at all critical in its handling. However, the fact that the initiator component must be released only by being dissolved from the base component greatly limits the binder selection. Many compromises must be accepted.

Another characteristic inherent to RPS is that the binder tends toward oxygen inhibition. In this case, the polymerization is inhibited by the oxygen present in the air. As a result, the adhesive strength is greatly reduced upon entering the air. This poses a considerable problem, particularly in 3d printing, in which large effective surfaces occur as a result of the process. Catalysts are added so that the reaction may take place at room temperature. These catalysts often pose a substantial health risk.

The object of the invention is therefore to provide, in different aspects, a method, a binder and a material system for building models in layers which do not have the disadvantages of known 3D printing methods, in particular RPS, or at least which reduce or fully overcome the disadvantages of the prior art.

The object is achieved by the embodiments described in greater detail in the claims.

In one aspect, the invention relates to a method for building models in layers, wherein a first material and subsequent thereto selectively a second material are applied in layers in a build space, and these two application steps are repeated until a desired model is obtained; the two materials form a solid body in a suitable mixing ratio; the first material contains a particulate material; and the second material is applied with the aid of a print head; and wherein the first material, the second material and/or the particulate material include(s) one or more diamines and/or one or more dicarbonyl compounds as the binder.

In another aspect, the invention relates to a use of one or multiple diamines and one or multiple dicarbonyl compounds in a method for building models in layers.

In another embodiment of this aspect, the invention relates to a use of one or multiple diamines and one or multiple dicarbonyl compounds for building models in layers, wherein a particulate material and subsequent thereto selectively one or multiple diamines and/or one or multiple dicarbonyl compounds are applied in layers in a build space with the aid of a print head, and these two application steps are repeated until a desired model is obtained.

In another aspect, the invention relates to a material system for building models in layers, comprising a first material and a second material, wherein one of the materials includes a particulate material and one of the materials includes one or multiple diamines and/or one of the materials includes one or multiple dicarbonyl compounds.

In another embodiment of this aspect, the invention relates to a materials system for building models in layers, wherein a first material and subsequent thereto selectively a second material are applied in layers in a build space, and these two application steps are repeated until a desired model is obtained; the two materials form a solid body in a suitable mixing ratio; the first material contains a particulate material; and the second material is applied with the aid of a print head, wherein the composition comprising the first and second materials and possibly the particulate material includes one or multiple diamines and one or multiple dicarbonyl compounds.

In another aspect, the invention relates to a solid body, manufactured by means of a method according to the invention, according to a use according to the invention or with the aid of a material system according to the invention.

The disadvantages of the prior art are overcome, or these disadvantages are at least mitigated, by means of the invention. Moreover, different advantages in the manufacture of three-dimensional models or components result from the invention.

Among other things, the fact that the invention provides an advantageous, two-component binder system, which permits peroxide-free, selective bonding of the individual layers in a polycondensation reaction, should be mentioned. In this case, two components—at least one diamine and at least one dicarbonyl compound—are caused to react. Both components are available and may be used in both liquid and solid form.

Since the method according to the invention, in which the composition according to the invention is to be used, provides a liquid and a powdered component (solid component), this results in a certain variety of embodiments which are, in principle, different:

1. The diamine and the dicarbonyl compound are both present in solid form in the powder component. The liquid component brings both components into solution after printing and facilitates the reaction.
2. A liquid diamine is applied id a powder which contains a dicarbonyl compound.
3. A liquid dicarbonyl compound is applied to a powder which contains a diamine.
4. A solid diamine is placed in a carrier solution and applied to a powder having a dicarbonyl compound.
5. A solid dicarbonyl compound is placed in a carrier solution and applied to a powder having a diamine.

To optimize the reaction in the method, use and material system according to the invention, liquid and solid reactants may also be combined, whereby only the separation of the reactants is crucial.

In addition, different substances (for example, different diamines and/or different dicarbonyl compounds) may be mixed, The solid component is always a mixture of a base material and the reagent used depending on the system. For example, PMMA in the form of a bead or emulsion polymerizate may be used as the base material. Since this component is not required for the reaction, however, a wide range of organic and inorganic materials may be used.

"Building models in layers" may be understood to mean any method in which thin layers are applied to each other in a cyclical manner and are subsequently solidified in the desired manner according to predefined data. 3D printing is used according to the invention, Working with a radically polymerizing system (RPS) is particularly preferred. Solid models and components may thus be obtained.

The invention is used in "three-dimensional printing methods," "3D printing methods," or "methods using a layering technique."

In 3D printing, methods which are used according to the invention, nozzles are used to apply material in the form of droplets, and these nozzles are customarily combined in print heads. Print heads used in 3D printing methods of this type usually comprise multiple components. So-called print modules, which have a limited number of individually controllable nozzles, form a key element thereof. The nozzles operate according to a drop-on-demand principle, customarily with the aid of piezoelectric actuators which cause one droplet to be discharged from each controlled nozzle upon the application of a corresponding current pulse. The droplets are relatively small and some of them have diameters of less than 50 μm.

In addition to the electrical connections, the print modules also have a fluid supply line which usually leads to a fluid reservoir, which is preferably located above the nozzles. The print modules are located in a receptacle which permits multiple modules to be aligned with each other.

It is apparent from the size of the droplets that the deviation of the nozzle positions in relation to each other must, in each case, be much less than the droplet diameter and is therefore usually only a few micrometers. A receptacle should therefore have a design which is as rigid as possible in order to statically and dynamically maintain a precise position of the print modules once this position has been selected.

The individual method steps, uses or the material system according to the invention are carried out or used, according to the invention, in a build space.

Working on a building platform which preferably has lateral limits and into which the necessary materials are introduced, is particularly preferred. All devices known for 3D printing may be used in the invention. Particularly preferred building platforms are the VX500 or VX800 (Voxeljet Technology GmbH, Friedberg).

All materials known in 3D printing which may be combined with the invention may be used as materials.

Depending on the embodiment, "binder" is understood to be the combination of at least one diamine and at least one dicarbonyl compound in a solid, liquid or dissolved form, whereby a polyamine forms in the powder bed which bonds the powder particles to each other and helps solidify the component in this manner. Another variant of the binder comprises dissolved diamine and/or dissolved dicarbonyl compound. In particular embodiments, this may also be understood to be the solvent which is used to facilitate the polymerization reaction and thus achieve the formation of a solid body.

Any 3-dimensional form based on, for example, predefined 3D computer data, may be obtained as the "model", "solid body" or "component." The solid bodies obtained are either models or prototypes or finished, usable components. The solid bodies may be subjected to additional operations.

"A suitable mixing ratio" is understood to be any mixing ratio of the materials and additional substances and components used, such as solvents, for the purpose of obtaining a solid body in a method for layered construction. Equimolar mixing ratios with regard to the number of carbonyl functions as opposed to the total number of amine functions, are preferably used. In one particularly preferred embodiment, a slight excess of amine component(s) is used.

In preferred embodiments of the method according to the invention, the solid body remains in a powder bed under environmental conditions for 5 to 24 hours, preferably for 8 to 12 hours, particularly preferably for 10 to 11 hours after the final applied layer has been printed.

In an additional step, the solid body may be subjected to heat treatment. The solid body is preferably stored at 40° C. to 60° C., preferably at 50° C. to 60° C. for 3 to 7 hours, more preferably for 4 to 6 hours.

The first material in the reaction preferably contains non-participating organic and/or inorganic substances.

"Non-participating organic and/or inorganic substances" are understood to be, for example, substances or substance mixtures which are suitable for facilitating a solid body in the method, the use and the material system according to the invention.

A particulate material containing PMMA (polymethyl methacrylate) or a powder based on PA (polyamide), for example Vestosint® (Degussa AG), Ultramid® (BASF SE) or Innov' PA (Exceltec sarl), may preferably be used as the first material.

In one preferred embodiment, the second material is an atomizable solution which contains diamines or dicarbonyl compounds. In another preferred embodiment, the atomizable solution contains neither of these two substances. The diamine and carbonyl compound or multiple diamines or carbonyl compounds are contained or included in the first material in this embodiment.

An "atomizable solution" is understood to be any solution or any fluid which may be selectively applied with the aid of nozzles to a defined location in a defined dose. Examples of "atomizable solutions" are the solvents used in the invention.

In one preferred embodiment, the second material may bring diamines or dicarbonyl components into solution in a solid phase.

"To bring into solution in a solid phase" is understood to mean that the at least one diamine and/or the at least one dicarbonyl compound is present in the solid phase, and the second material is selected in such a way that it is able to bring diamines and dicarbonyl compounds into solution.

In one preferred embodiment, the second material is a solvent, preferably a solvent mixture. It may preferably be a polar solvent. Aliphatic and aromatic alcohols and esters are preferably used, particularly preferably propanol, butanol, hexanol, benzyl alcohol, ethyl acetate and hexyl acetate.

An excess amount of one of the two components may be present after the processing compound has been added via the print head. The two components are particularly preferably present in an equimolar ratio. The two components comprise either pure substances or a mixture of corresponding substance classes. A solvent mixture including or comprising 50 wt % benzyl alcohol, 25 wt % hexyl acetate and 25 wt % 2-propanol is particularly preferred.

The diamine and dicarbonyl compound may be present in any suitable form that makes them usable in the invention, the diamine and dicarbonyl compound being preferably present in the second material The second material particularly preferably contains one or multiple diamines and/or one or multiple dicarbonyl compounds in the liquid or solid phase.

All known components that are compatible with the other components and substances which may be used according to the invention may be used as dicarbonyl compounds. In one preferred embodiment, the dicarbonyl compounds are replaced or supplemented by metal salts of dicarbonyl compounds.

For example, the following "metal salts" of dicarbonyl compounds may be used, particularly preferably "metal salts" of acetylacetone: zinc acetylacetonate, manganese acetylacetonate, preferably copper acetylacetonate, iron(II) acetylacetonate and iron(III) acetylacetonate. The condensate of the reaction is preferably removed from the system with the aid of hygroscopic substances. The printing process may furthermore be carried out at an elevated temperature, or an oven process may be subsequently carried out, or both, in order to enhance the removal of the condensate.

Moreover, catalytic quantities of protons in the form of organic acids may be used to optimize the reaction. Lewis acids are conceivable as alternative catalysts.

The substances and components used according to the invention may be present in any suitable form. The diamine and/or the dicarbonyl compound is/are preferably present in a carrier solution.

Aliphatic and aromatic alcohols and esters may preferably be used as the "carrier solution," particularly preferably propanol, butanol, hexanol, benzyl alcohol, ethyl acetate and hexyl acetate. In preferred embodiments, the diamine is selected from the group comprising primary diamine alkanes, preferably diaminododecane, diaminohexadecane, and polyamines, preferably spermine, and aromatic diamines, preferably phenylenediamine, diaminobenzoic adds, particularly preferably 3,5-diaminobenzoic acid, and liquid diamines, preferably ethylenediamine, propylenediamine and/or spermidine.

The diamine is preferably present in a quantity of 5 to 15 wt %, preferably 8 to 12 wt %, particularly preferably 10 wt % in relation to the total quantity.

"Total quantity" is understood to be the sum of the masses of the base material (PMMA or PA) and the active component in the powder.

The dicarbonyl compound is preferably selected from the group comprising diketone compounds and their metal complexes, in particular the liquid acetylacetone under process conditions and 2,5-hexandione, copper(II) acetylacetonate, iron(III) acetylacetonate in solid form, and liquid dialdehydes, preferably glyoxal, glutaraldehyde, and the solids phthaldialdehyde, isophthaldialdehyde and terephthaldialdehyde.

The binder content is preferably between 5 wt % and 40 wt %, preferably between 8 wt % and 15 wt %, particularly preferably between 9 wt % and 11 wt %.

The invention furthermore relates to a solid body, manufactured by means of a method according to the invention, according to a use according to the invention or with the aid of a material system according to the invention.

A solid body according to the invention preferably has a solidity of 6 to 8 MPa, particularly preferably 6 to 7 MPa, and/or a modulus of elasticity of 700 to 950 MPa, particularly preferably 750 to 900 MPa.

The invention is illustrated in preferred embodiments in the following examples.

EXAMPLES

1. Description of the Basic Chemical Reaction

The reaction takes place between a diamine and a dicarbonyl compound in a condensation reaction, forming a poly-Schiff base in the dissolved phase. A nucleophilic attack on the carbonyl compound by the nitrogen takes place, and a semiaminal results as the intermediate product, which is then converted to imine by water elimination. This reaction represents an equilibrium reaction, the establishment of which may be accelerated by adding catalytic quantities of protons and which may be shifted to the polymer side by removing the condensation product.

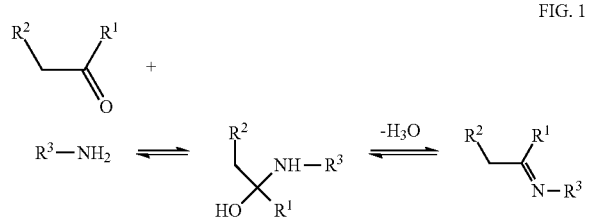

FIG. 1

Representation of a Schiff base comprising a ketone (R1 = C) or an aldehyde (R1 = H) and a primary amine with the aid of water elimination

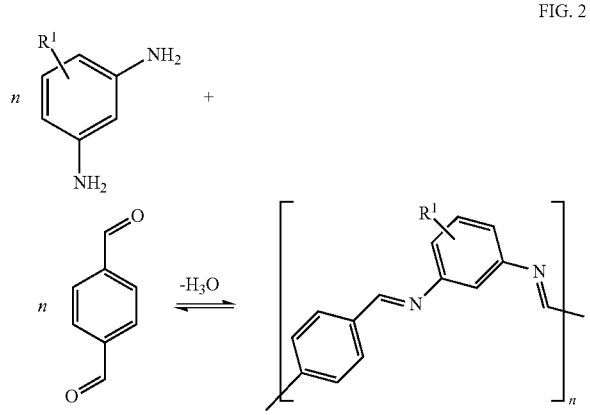

FIG. 2

Representation of a poly-Schiff base comprising a diamine and a dialdehyde with the aid of water elimination

2. Preferred Substances Used

PMMA is particularly preferably used as the base material. PA-based powder (Vestosint®) is likewise preferably used.

Aliphatic and/or aromatic diamines may be added to the base powder as the solid. Primary diamine alkanes such as diaminododecane, diaminohexadecane are preferably used, or polyamines such as spermine, aromatic diamines such as phenylenediamine, diaminobenzoic acids, particularly preferably 3,5-diaminobenzoic acid.

Ethylenediamine, propylenediamine, spermidine are preferred as liquid diamines. Diketone compounds and their metal complexes are preferably used as dicarbonyl compounds, in particular liquid acetylacetone under process conditions and 2,5-hexandione, copper(II) acetylacetonate, iron (III) acetylacetonate in solid form, preferably liquid dialdehyde, in particular glyoxal, glutaraldehyde, particularly preferably the solids phthaldialdehyde, isophthaldialdehyde and terephthaldialdehyde.

The component processed via the print head is processed either as a pure substance or in dissolved form. Aliphatic and aromatic alcohols and esters are preferably used as solvents, particularly preferably propanol, butanol, hexanol benzyl alcohol, ethyl acetate and hexyl acetate. An excess amount of one of the two components may be present after the compound processed via the print head been added; the two components are particularly preferably present in an equimolar ratio. The two components comprise either pure substances or a mixture of corresponding substance classes.

3. A System Having Liquid Diketone 0.6 kg of 3,5-diaminobenzoic acid (10 wt % in relation to the total quantity) are mixed into 5.4 kg of a PMMA of the M546 type for approximately 1.5 hours, using a hall mill, until a homogeneous mixture is obtained. The mill balls are then sifted. As the liquid component, 2,5-hexandione is used as the binder.

Following the preparations, the materials are processed in a 3D printer. The added binder is between 5 wt % and 40 wt %, preferably between 8 wt % and 15 wt%, particularly preferably between 9 wt % and 11 wt %.

The components remain in the powder bed under environmental conditions for 5 to 24 hours after the final applied layer has been printed. They may then be safely removed from the powder bed without any deformation.

The components are then stored at 40° C. to 60° C. for 3 to 7 hours, preferably for 4 to 6 hours. Solidities on the PMMA base material of 7 MPa and a modulus of elasticity of 900 MPa have been measured. The body achieved in this manner is porous.

4. A System Having Solid Reactants

Both material components are present in the powder bed and are printed with a solvent or a solvent mixture.

0.6 kg of 3,5-diaminobenzoic acid and 0.53 kg of terephthaldialdehyde are homogeneously mixed into 4.87 kg of a PMMA of the M546 type for 1.5 hours, using a ball mill. The balls are sieved, and the powder is processed in a 3D printing machine. A solvent mixture comprising 50 wt % benzyl alcohol, 25 wt % hexylacetate and 25 wt % 2-propanol is used as the binder system.

Following the preparations, the materials are processed in a 3D printer. The added binder is preferably between 5 wt % and 40 wt %, preferably between 8 wt % and 15 wt %, particularly preferably between 9 wt % and 11 wt %.

The components remain in the powder bed under environmental conditions for 5 to 24 hours after the last applied layer has been printed. They may then be safely removed from the powder bed without any deformation.

The components are then stored at 40° C. to 50° C. for 3 to 7 hours, preferably for 4 to 5 hours. Solidities on the PMMA base material of 6.5 MPa and a modulus of elasticity of 750 MPa have been measured. The body achieved in this manner is porous.

What is claimed is:

1. A method for building models in layers, wherein a first material and subsequent thereto selectively a second material are applied in layers in a build space, and these two application steps are repeated until a desired model is obtained; the two materials form a solid body in a suitable mixing ratio; the first material includes particulate material; and the second material is applied with the aid of a print head, and wherein the first material, the second material or the particulate material includes at least one or more dicarbonyl compounds as a binder.

2. The method according to claim 1, wherein the method includes a step of printing a final applied layer, and the solid body remains in a powder bed under environmental conditions for 5 to 24 hours after the final applied layer has been printed.

3. The method according to claim 1, wherein the solid body is subjected to heat treatment in an additional step, the solid body being stored at 40° C. to 60° C.

4. A material system for building models in layers, comprising a first material and a second material, wherein one of the materials includes a particulate material and one of the materials includes one or multiple diamines and one of the materials includes one or multiple dicarbonyl compounds as a binder.

5. A method for building models in layers, wherein a first material and subsequent thereto selectively a second material are applied in layers in a build space, and these two application steps are repeated until a desired model is obtained; the two materials form a solid body in a suitable mixing ratio; the first material contains a particulate material; and the second material is applied with the aid of a print head, wherein the composition comprising the first and second materials includes diamines and dicarbonyl compounds.

6. The material system according to claim 4, wherein the first material contains organic or inorganic substances which do not participate in a reaction with the binder.

7. The material system according to claim 4, wherein a particular material containing PMMA or a powder based on PA is used as the first material.

8. The material system according to claim 4, wherein the second material is an atomizable solution which contains diamines or dicarbonyl compounds.

9. The method according to claim 1, wherein the binder includes one or more diamines, and the first material, the second material or the particulate material includes the at least one or more diamines.

10. The material system according to claim 4, wherein the second material is a solvent.

11. The material system according to claim 4, wherein the second material contains the diamines or dicarbonyl compounds in a liquid phase.

12. The material system according to claim 11, wherein the material system includes metal salts of dicarbonyl compounds.

13. The method according to claim 9, wherein the method includes a step of reacting the one or more diamines and the one or more dicarbonyl compounds and a step of removing condensate of the reaction from the system with the aid of hygroscopic substances.

14. The material system according to claim 4, wherein the diamine and/or the dicarbonyl compound is present in a carrier solution.

15. The material system of claim 4, wherein the one or multiple diamines includes a diamine selected from the group comprising primary diamine alkanes, polyamines, aromatic diamines, diaminobenzoic acids, and liquid diamines.

16. The material system according to claim 15, wherein the diamine is present in a quantity of 5 to 15 wt % in relation to the total quantity.

17. The material system according to claim 4, wherein the dicarbonyl compound is selected from the group consisting of diketone compounds and their metal complexes, liquid dialdehydes, solid phthaldialdehyde, solid isophthaldialdehyde and solid terephthaldialdehyde.

18. The material system according to claim 4, wherein the binder is between 5% and 40%.

19. A solid body manufactured with the method of claim 1, wherein the solid body has a modulus of elasticity of 700 to 950 MPa.

20. The material system according to claim 4, wherein the second material is a solvent mixture of benzyl alcohol, hexylacetate and 2-propanol.

* * * * *